UNITED STATES PATENT OFFICE.

JOHN MARION STUKES, OF SAN ANTONIO, TEXAS.

PACKING COMPOUND FOR EGGS, &c.

SPECIFICATION forming part of Letters Patent No. 691,413, dated January 21, 1902.

Application filed November 13, 1901. Serial No. 82,093. (No specimens.)

*To all whom it may concern:*

Be it known that I, JOHN MARION STUKES, a citizen of the United States, residing at San Antonio, in the county of Bexar and State of Texas, have invented certain new and useful Improvements in Packing Compounds; and I do hereby declare that the following is a full, clear, and exact description of the same.

The present invention has for its object to provide a compound to be used for packing eggs, fruit, vegetables, and such perishable products as would be required to exclude the air to preserve the same during transportation or when stored away for future use and also for keeping field or garden seed in a good condition for future use. This compound comprises a mixture of dry powdered clay, chalk, and lime, and any suitable proportions, but preferably as follows: dry powered clay, one hundred parts; dry powdered chalk, fifty parts, and fresh slaked dry lime, seven parts. Mix well together to form a powdered compound and use it to cover the object to be preserved, which will effectually exclude the air and has all the preserving qualities of the clay and lime and all the absorbent qualities of the chalk, which makes the compound a perfect air-tight preservative, and also has the properties of being a non-conductor of heat and cold, which are the two things to guard against in the preservation of eggs, vegetables, fruit, and like products. The compound being a powder and very soft it will run in and around every crevice and packs itself tightly, and thus forms an absolutely air-tight packing to the exclusion of air, moisture, heat, and cold.

Having now fully described my invention, what I claim as new, and desire to secure by Letters Patent, is—

A packing compound comprising powdered clay, chalk and lime, in substantially the proportions named.

In testimony that I claim the above I have hereunto subscribed my name in the presence of two witnesses.

JOHN MARION STUKES.

Witnesses:
NICKOLAUS WEVERBELE,
GOTTLIEB JELLWEGER.